United States Patent
Loce et al.

(10) Patent No.: US 7,525,704 B2
(45) Date of Patent: Apr. 28, 2009

(54) SYSTEM FOR PROVIDING DEPTH DISCRIMINATION OF SOURCE IMAGES ENCODED IN A RENDERED COMPOSITE IMAGE

(75) Inventors: Robert P. Loce, Webster, NY (US); Yeqing Zhang, Penfield, NY (US); Gaurav Sharma, Webster, NY (US); Steven J. Harrington, Webster, NY (US); Peter A. Crean, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 678 days.

(21) Appl. No.: 11/311,950

(22) Filed: Dec. 20, 2005

(65) Prior Publication Data

US 2007/0139520 A1    Jun. 21, 2007

(51) Int. Cl.
H04N 1/46    (2006.01)
H04N 13/04    (2006.01)

(52) U.S. Cl. ................. 358/540; 358/450; 382/154; 348/60

(58) Field of Classification Search ......... 358/450, 358/475, 509, 540; 382/154; 348/42, 51, 348/60
See application file for complete search history.

(56) References Cited

U.S. PATENT DOCUMENTS

| | | |
|---|---|---|
| 1,768,812 A | 7/1930 | Whiting |
| 3,234,663 A | 2/1966 | Ferris et al. |
| 3,287,825 A | 11/1966 | Ryan et al. |
| 3,969,830 A | 7/1976 | Grasham |
| 4,290,675 A | 9/1981 | Beiser |
| 4,586,711 A | 5/1986 | Winters et al. |
| 4,597,634 A | 7/1986 | Steenblik |
| 4,717,239 A | 1/1988 | Steenblik |
| 4,824,144 A | 4/1989 | Tasma |
| 4,959,641 A * | 9/1990 | Bass et al. ............. 345/6 |
| 5,002,364 A | 3/1991 | Steenblik |
| 5,369,261 A | 11/1994 | Shamir |
| 5,371,627 A | 12/1994 | Baccei et al. |

(Continued)

FOREIGN PATENT DOCUMENTS

GB    168 880    3/1922

(Continued)

OTHER PUBLICATIONS

Hunt, R.W.G., "Light Sources", The Reproduction of Colour in Photography, Printing & Television, Fourth Edition (1987), pp. 151-176.

(Continued)

Primary Examiner—Thomas D Lee
(74) Attorney, Agent, or Firm—Fay Sharpe LLP (57) ABSTRACT

A system for enabling depth perception of image content in a rendered composite image, wherein illuminant/colorant depth discrimination encoding provides encoding of first and second source images in a composite image, for the purposes of subsequent illuminant/colorant depth discrimination decoding. Composite image rendering allows for rendering the composite image in a physical form. Illuminant/colorant depth discrimination decoding allows recovery of the first and second source images, thus offering to an observer the perception of spatial disparity between at least one of the recovered source images and some or all of the remaining image content perceived in the rendered composite image.

20 Claims, 6 Drawing Sheets
(2 of 6 Drawing Sheet(s) Filed in Color)

U.S. PATENT DOCUMENTS

| | | | |
|---|---|---|---|
| 5,398,131 | A | 3/1995 | Hall et al. |
| 5,483,363 | A | 1/1996 | Holmes et al. |
| 5,491,646 | A | 2/1996 | Erskine |
| 5,576,528 | A | 11/1996 | Chew et al. |
| 5,594,841 | A | 1/1997 | Schutz |
| 5,619,219 | A | 4/1997 | Coteus et al. |
| 5,715,316 | A | 2/1998 | Steenblik et al. |
| 5,768,410 | A | 6/1998 | Ohta et al. |
| 5,929,906 | A | 7/1999 | Arai et al. |
| 6,002,498 | A | 12/1999 | Haraguchi et al. |
| 6,155,491 | A | 12/2000 | Dueker et al. |
| 6,301,044 | B1 | 10/2001 | Huber et al. |
| 6,333,757 | B1 | 12/2001 | Faris |
| 6,406,062 | B1 | 6/2002 | Brooks et al. |
| 6,516,094 | B1 | 2/2003 | Takahashi et al. |
| 6,561,422 | B1 | 5/2003 | Cariffe |
| 6,590,996 | B1 | 7/2003 | Reed et al. |
| 6,722,066 | B1 | 4/2004 | Cheung |
| 6,763,124 | B2 | 7/2004 | Alattar et al. |
| 6,766,045 | B2 | 7/2004 | Slepyan et al. |
| 6,832,729 | B1 | 12/2004 | Perry et al. |
| 6,891,959 | B2 | 5/2005 | Reed et al. |
| 6,993,149 | B2 | 1/2006 | Brunk et al. |
| 2003/0052179 | A1 | 3/2003 | Pinson |
| 2004/0070588 | A1 | 4/2004 | Harrington et al. |
| 2004/0071310 | A1 | 4/2004 | Sharma et al. |
| 2004/0071339 | A1 | 4/2004 | Loce et al. |
| 2004/0071348 | A1 | 4/2004 | Harrington et al. |
| 2004/0071349 | A1 | 4/2004 | Harrington et al. |
| 2004/0071359 | A1 | 4/2004 | Sharma et al. |
| 2004/0071365 | A1 | 4/2004 | Zhang et al. |
| 2004/0071366 | A1 | 4/2004 | Zhang et al. |
| 2004/0101201 | A1 | 5/2004 | Sharma et al. |

FOREIGN PATENT DOCUMENTS

| | | |
|---|---|---|
| WO | WO 96/03833 | 2/1996 |

OTHER PUBLICATIONS

Richard W. Harold, "An Introduction To Appearance Analysis", Secondsight, SS No. 84, A reprint from GATFWorld, the magazine of the Graphic Arts Technical foundation (2001).

Dengler, M., Nitschke, W., "Color Stereopsis: A Model for Depth Reversals Based on Border Contrast", Perception and Psychophysics, vol. 53, No. 2 (1993), pp. 150-156.

Winn et al., "Reversals of the Colour-Depth Illusion Explained by Ocular Chromatic Aberration", Vision Res., vol. 35, No. 19 (1995), pp. 2675-2684.

Sharma, G., "Digital Color Imaging", IEEE Transactions On Image Processing, vol. 6, No. 7 (1997) pp. 901-932.

Sharma et al., "Illuminant Multiplexed Imaging: Special Effects using GCR", The 11th Color Imaging Conference, Nov. 3, 2003, pp. 266-271.

Sharma et al., "Illuminant Multiplexed Imaging: Basics and Demonstration", 2003 Pics Conference, vol. 6, May 13, 2003, pp. 542-547.

* cited by examiner

SYSTEM FOR PROVIDING DEPTH DISCRIMINATION OF SOURCE IMAGES ENCODED IN A RENDERED COMPOSITE IMAGE

The present invention relates to systems for enabling depth perception of image content in a rendered image.

The content of a printed image presented on a planar substrate is typically perceived as two-dimensional and lacking in depth. However, it is known to create or modify such image content so as to provide certain visual cues that enable a slight perception of depth.

For example, the overlay (interposition) of two objects can impart a cue that a first object appears closer to the viewer than a second object, if the first object appears to block a portion of the second object from view. Objects that have shadows or differences in their relative size can seem to have spatial separation if they are of known absolute or relative sizes. A linear perspective, imparted by lines representing physically parallel structures that seem to converge in the distance, or a texture gradient in a regular structure, e.g., a tiled floor which appears to show smaller structures with increasing distance, can also impart a sense of depth. The brightness and the color of two otherwise identical objects can be differentiated to impart a sense of one object being closer to the observer. Objects or structures portrayed in warm colors can seem closer to the viewer than those portrayed in cool colors. In particular, color stereopsis refers to the effect of stimulus color on perceived depth of stimuli viewed binocularly. The wavelength of a stimulus affects its perceived depth in color stereopsis by prismatic effects in human optics, with long-wavelength stimuli normally seen in front of short-wavelength stimuli; the background of the stimulus has been considered by some to affect depth order as well. (See, e.g., Dengler, M., Nitschke, W., *Color stereopsis: a model for depth reversals based on border contrast*, Perception and Psychophysics, February 1993, vol. 53, no. 2, pages 150-156.) Alterations to image content in order to afford such visual effects have been used, for example, to enhance the appearance of elevation in topographic maps.

Stereoscopic imaging techniques have been devised for rendering flat, two-dimensional images that stimulate a greater illusion of depth. These techniques can include binocular stereoscopic imaging and autostereoscopy (or three-dimensional spatial imaging). Devices for performing binocular stereoscopic imaging include binocular viewers, parallax stereograms, lenticular-sheet binocular stereoscopic pictures, and binocular displays using polarized lenses or color filters. Devices for performing autostereoscopy include parallax panoramagrams, lenticular-sheet three-dimensional imaging, projection-type three-dimensional displays, and integral photography.

In stereoscopy, a three-dimensional image is created by a series of two-dimensional images of an object captured from different perspectives, and therefore the three-dimensional image so produced contains multiple-angle information about the object. Physically displaced views of the same image are presented simultaneously to the eyes of an observer to convey the illusion of depth. These techniques typically employ a multiplexed pair of images, wherein the images are nearly identical and differ only so as to simulate parallax. The multiplexing can be performed according to color, polarization, temporal, or positional differences between the constituent images. For example, anaglyphic stereoscopy is a known process in which a pair of nearly-identical images are color-encoded by use of respective complementary color filters (e.g. cyan and red) for subsequent viewing through correspondingly-colored lenses so as to separate the images as necessary for a simulated three-dimensional effect. When viewed through colored spectacles, the images merge to produce a stereoscopic sensation. The encoded image pair is known as an anaglyph, as it is typically rendered as two images of the same object taken from slightly different angles in two complementary colors.

Stereoscopic viewing of the multiplexed image pair typically requires the use of optical devices to channel each of the paired (left and right) images solely to the appropriate eye of the observer. A few autostereoscopic display techniques are known for providing subjectively three-dimensional viewing of a fixed image plane, without resort to eyewear and the like, by use of alternative devices based upon direction-multiplexed image displays. These devices typically employ optical diffraction, lenticular imaging, or holographic phenomena.

Accordingly, the present invention is directed to methods and systems for encoding plural source images and for combining the encoded plural source images in a composite image, for rendering the composite image in a physical form by imagewise deposition of selected narrowband colorants on a substrate, and for enabling the perception of at least one of the first and second source images at a depth differential in the rendered composite image upon the controlled illumination of the rendered composite image by use of plural narrowband illuminants. At least one recovered source image is thus perceived to have spatial disparity with respect to some or all of the image content in the rendered composite image. Such perception of spatial disparity among the content of the rendered composite image is considered herein to be "depth discrimination".

A given source image may be encoded by mapping values representative of each source image pixel to a corresponding pixel value in one or more of a plurality of colorant image planes. The composite image may be defined according to the combination of such plurality of colorant image planes, and can have any number of different patterns of pixels which will ultimately be rendered using a plurality of colorants. However, a primary characteristic of the composite image is that some image content is encoded to be rendered using a first colorant having a particular spectral absorption characteristic, and other image content to be rendered using a second colorant having a second, differing spectral absorption characteristic.

In general, the image content that is to be written with a colorant that absorbs short wavelengths will be perceived to be more distant than image content that is written with a colorant that absorbs long wavelengths. Accordingly, an encoder may be employed for writing a first image plane into a composite image whereby certain pixels in the composite image are to be rendered with use of a colorant that primarily absorbs light in the long wavelengths, and for writing a second image plane into the composite image whereby certain pixels are to be rendered using another colorant that primarily absorbs light in the short wavelengths. An image recording device then may be employed to render the corresponding composite image on a substrate, and a decoder may be employed to simultaneously illuminate the rendered composite image with at least two illuminants respectively having the selected long and short wavelengths. Thus, with the colorants so chosen, and the exposure of the rendered composite image to the chosen complementary illuminants, the image content that was encoded in the first image plane is perceptible as being located in the foreground with respect to the image content that was encoded in the second image plane; or alternatively, the image content that was encoded in the second image plane is perceptible as being located in the background with respect to the image content that was encoded in the first image plane.

The composite image may be stored or transmitted as a composite image file. The composite image may then be physically realized by delivering the composite image file to a rendering device with instructions for rendering the composite image on a substrate using an identified array of colorants, whereby the array includes the colorants selected for enabling depth discrimination. One suitable embodiment of a rendering device therefore includes a digital color printer.

A plurality of monochromatic separation images may be used as source images and the encoder may be operated to combine such separation images into a composite image. The separation images thus encoded will control the amount of respective colorants to be deposited on a substrate so as to produce a rendered composite image. For example, each colorant may be assigned to a respective colorant image plane of the composite image, and the colorant values in the respective colorant image planes represent the relative amounts of colorant deposited in the rendered composite image. A rendered composite image may be rendered using an array of colorants selected from conventional compositions, such as pigments, inks, dyes, or toners, in cyan, magenta, yellow, and black, that are deposited on a substrate by a rendering device.

The pixel mapping of each source image may employ determinations for compensating for the interaction of the following on the encoding, rendering, or decoding of the composite image: (a) the spectral characteristics of the colorants selected for rendering the composite image, such spectral characteristics especially comprehending the interaction of those colorants when such are combined on the particular substrate, and (b) the spectral characteristics of the narrowband illuminants that will be used to illuminate the composite image for recovering the source images.

The encoder may be provided in the form of a computer operable for receiving image data files representative of a plurality of source images and for encoding the source images to form a composite image provided in a composite image data file. The encoder may optionally include a composite image file storage and/or transmission device connected to the computer.

The composite image may be realized as a single, complex, rendered pattern of deposited colorants, wherein at least two colorants are selected for their particular spectral reflectance characteristic or spectral absorption characteristic, and in particular for their narrowband spectral absorption characteristic. Contemplated colorants include cyan, magenta, and yellow colorants, for which the respective complementary illuminants have spectral distributions in the red, green, and blue regions of the visible spectrum.

A subsystem for rendering the composite image may include an image recording device for receiving the composite image data file and for rendering the corresponding composite image on a substrate. The image recording device may be provided in the form of a printer connected to the encoder or to the composite image file storage and/or transmission device, for printing the composite image on a substrate. The printer may employ colorants in the form of pigments, inks, or dyes selected for their apparent darkness when exposed to the designated complementary illuminants.

A source image may be recovered by subjecting the rendered composite image to a field of illumination that includes at least two complementary illuminants, that is, a pair of illuminants each having a selected spectral power distribution which corresponds to the spectral reflectance characteristic or spectral absorption characteristic of the respective one of the selected colorants. The corresponding source image is depth discriminated within the rendered composite image when the rendered composite image is subjected to illumination by the complementary illuminants.

A decoder may include an illumination device for subjecting the rendered composite image to an incident light spectrum having a selected spectral power distribution in at least two selectable bands of radiant energy. In a typical embodiment, such selectable bands would correspond to two of the long, medium, and short (LMS) wavelength bands of the visible light spectrum. In one embodiment, a decoder may be employed to subject the rendered composite image to illumination exhibiting a spectral power distribution located in first and second wavelength bands, such that a first source image is recovered with depth discrimination; the decoder can alternatively subject the rendered composite image to illumination exhibiting a spectral power distribution located in the second and third of the three wavelength bands, or to the first and third of the three wavelength bands, such that a second source image is recovered with depth discrimination.

The two illuminants can be applied simultaneously, or, alternately applied at a switch rate. One desirable switch rate would be at a frequency that is above the "flicker response" of the human visual system, thus, at roughly 40 to 60 Hz or higher. Lower switch rates, e.g. 1-20 Hz may in some instances be sufficiently effective to elicit depth discrimination due to the tendency of the human visual system for persistent memory of the perceived depth. For the purpose of description herein, "simultaneous" illumination is therefore considered to include concurrent illumination, or switched illumination that serves to illuminate at a switch rate within the capacity of the observer to maintain memory of perceived depth. Thus, "simultaneous" may also be understood to refer to illumination capable of eliciting simultaneous perception of images.

The decoder may include an illuminant source responsive to manual control, or to control by illuminant source control signals provided by a controller. The illuminant source may include one or more light sources for providing desired spectral power distributions in single or plural selectable bands of radiant energy. For example, the light sources can output predefined spectral power distributions in the red, green, and blue regions of the visible spectrum.

The controller may include a computer operable according to control programs for generating one or more of the illuminant source control signals, and the illuminant source may be responsive to the illuminant source control signals for generating a field of illumination of narrowband illuminants each having a selectable intensity and spectral power distribution, whereby a rendered composite image on a substrate may be positioned within the field of illumination and thereby subjected to simultaneous illuminants that exhibit the desired spectral power distributions.

Alternately, the decoder may include plural illuminant sources that are positioned so as to provide spatially distinct fields of illumination. The rendered composite image may be moved rapidly to and from these fields of illumination such that it is sequentially illuminated at a rate comparable to the switch rate, whereby the rendered composite image is illuminated at a switch rate within the capacity of the observer to maintain memory of perceived depth.

A rendered composite image, when subject to a wideband illumination condition such as ambient white light, may be perceived to exhibit visual confusion, that is, the appearance of the rendered composite image will lack, to a certain extent, perceptible resemblance to one or more of the source images encoded therein. Certain embodiments of the contemplated system may find advantageous use in providing a rendered composite image which, when subjected to a wideband illumination condition, appears visually confused yet subsequently can reveal one or more depth-discriminated images when the wideband illumination is replaced by the controlled narrowband illumination described herein.

The patent or application file contains at least one drawing executed in color. Copies of this patent or patent application publication with color drawing(s) will be provided by the Office upon request and payment of the necessary fee.

According to the teachings herein, a colorant may be considered to include a dye, pigment, ink, toner, or other agent used to impart a color to a substrate. Colorants impart color by altering the spectral power distribution of the light they receive from incident illumination via two primary physical phenomenon: absorption and scattering. Color is produced by spectrally selective absorption and scattering of the incident light, while allowing for transmission of the remaining light. A narrowband (absorbing) colorant exhibits an absorption band that is situated in a substantially narrow region of the visible region of the spectrum. Cyan, magenta, and yellow toners are examples of narrowband colorants that selectively absorb red, green, and blue spectral regions, respectively. Some colorants, such as most colored toners, impart color via a dye operable in transmissive mode. Other suitable colorants may operate according to a selectably reflective characteristic.

A composite image may be considered as an array of values representing an image formed as a composite of plural overlaid (or combined) colorant image planes. Source images may be encoded in respective image planes and the resulting image planes may be combined to form a composite image.

An image may be considered as an array or pattern of pixels that are mapped in a two-dimensional format. The intensity of the image at each pixel is translated into a numerical value which may be stored as an array that represents the image. Two-dimensional arrays of values may also be referred to as "planes." An array of numerical values representing an image is referred to as an image plane. For example, the uppercase letters C, Y, M, K are used herein to indicate two-dimensional arrays of values representing monochromatic images or separable components of a polychromatic (multicolor) image. For example, the Y plane can refer to a two-dimensional array of values that represent the yellow component at every location (pixel) of an image.

A monochromatic or black and white (gray scale) image is typically represented as a two-dimensional array where the location of a pixel value in the array corresponds to the location of the pixel in the image. Multicolor (polychromatic) images are represented by multiple two-dimensional arrays. In a typical three-color arrangement, each array represents one of the primary colors. In the digital processing of color images, the individual color separations are represented as a digital image with a plurality of discrete elements ("pixels") defined by position and gray value. In such a system, gray value is described as one level in a number of possible states or levels. When more than two different levels are used in the description of an image, the levels are termed "gray" (without regard to the actual color) to indicate that the pixel value is between some maximum and minimum level.

An illuminant may be considered to be incident luminous energy specified by its relative spectral power distribution; it is typically provided by a light source having light output in a predefined spectral power distribution. A narrowband illuminant is an illuminant having a spectral power distribution that is substantially limited to a narrow region of the spectrum. The bandwidth of the narrow region may vary, from the extremely narrow (such as from a LASER source), to that provided in the form of natural or artificial light transmitted through a band-limited color filter. An illuminant that is designed to particularly interact with a given colorant is said to be complementary, and vice versa. A complementary illuminant typically exhibits a spectral power distribution that is centered substantially within the spectral absorption band of a particular colorant.

Red, green, and blue (R, G, B) are standard additive primary colors. Cyan, magenta, and yellow (C, M, Y) are standard subtractive primary colors. Black (K) colorant absorbs light energy substantially uniformly over the full extent of the visible spectrum and may be added to enhance color and contrast and to improve certain printing characteristics. Cyan, magenta, and yellow are the subtractive complements of red, green, and blue, respectively and they absorb the light energy in the long, middle, and short wavelength regions, respectively, of the visible spectrum, leaving other regions of the visible spectrum unchanged. Ideally, the absorption bands of individual C, M, Y colorants are non-overlapping and completely cover the visible region of the spectrum.

An idealized cyan colorant, for instance, may be defined as having an absorption band over the wavelength interval of about 600-700 nm, commonly referred to as red light, or the red region of the spectrum. Likewise, an idealized magenta colorant has an absorption band over the interval of about 500-600 nm, commonly referred to as green light, or the green region of the spectrum; and an idealized yellow colorant has an absorption band over the interval of about 400-500 nm, commonly referred to as blue light, or the blue region of the spectrum. Actual C, M, Y colorants do not satisfy these block-dye assumptions; instead, their absorption spectra are smooth and include some unwanted absorptions in their transmission bands.

In reality, colorants exhibit significant deviations from this idealized behavior, including variations of absorption within the absorption band, extension of the absorption band beyond the idealized limits, and scattering. In particular, the absorption of light in a spectral region outside the main absorption band of a colorant (as, for example, demonstrated by absorption in the blue and red regions of the spectrum by a magenta colorant), is considered unwanted absorption. Among typical colorants used for CMYK printing, magenta demonstrates the most unwanted absorption, and yellow demonstrates the least unwanted absorption. The black colorant absorbs uniformly through the visible region of the spectrum and can be used as a replacement for combined CMY printing for reasons of economy and improved rendition of dark regions.

Thus, according to the subtractive principle, a surface layer of a substrate such as a sheet of white paper, on which one can vary the concentrations of cyan, magenta, and yellow colorants, thereby offers the means of varying the intensities of the reddish, greenish, and bluish parts of the white light reflected from the paper. To produce a subtractive color image reproduction, one can control the concentrations of the three colorants independently at localized areas on the paper substrate.

For a general understanding of the present invention, reference is made to the drawings. In the drawings, like reference numerals have been used throughout to designate identical elements.

Embodiments described herein accordingly exploit the interaction between certain narrowband illuminants and their complementary colorants, and the manner in which the eye detects images recovered with illuminants having narrowband spectral power distributions. The methodology described herein describes use of at least two narrowband illuminants and two colorants, and for the purpose of simplicity the embodiments are described with reference to the cyan, magenta, yellow, and black colorants commonly used in color printing applications, and to the narrowband red, green, and blue illuminants commonly generated by conventional narrowband light sources. This description thus makes reference to the handling of monochromatic and polychromatic source images encoded according to an array of colorants such as the CMYK color primaries. However, it will be apparent to one of ordinary skill in the art that there are alternative spectral schemes to be employed. An alternative would include a color system that employs primary colorants other than CMYK for color representations, such as systems that use RGB primaries or high-fidelity colorants such as orange and green.

Encoding may be performed by use of either software, hardware, or a combination of software and hardware implementations; rendering may be performed by use of a rendering device in the form of a color hardcopy output device, such as a printer; and decoding performed by use of a controlled illumination source, such may include as two or more narrowband light sources such as light emitting diodes (LED).

General aspects of embodiments may be understood by considering the use of N colorants and N narrowband illuminants. Particular examples are cyan and yellow colorants and their respectively complementary narrowband illuminants (red and blue).

Use of cyan colorant in a rendered composite image subject to red narrowband illumination (i.e., cyan/red) with yellow/blue may offer the most significant depth discrimination. Cyan/red with magenta/green may offer less depth discrimination, and yellow/blue with magenta/green may offer still less depth discrimination. Note that uncommon colorants could also be used: For instance, image content encoded for the deposition of orange toner that is illuminated by a illuminant in the green to blue region may offer depth discrimination with respect to image content encoded according to the deposition of cyan toner and illuminated by an illuminant in the red region. Another example would be image content encoded for deposition using green toner and subject to orange illumination, which will be depth discriminated with respect to image content encoded according to the deposition of magenta toner and subject to a green illuminant.

Figure 1:
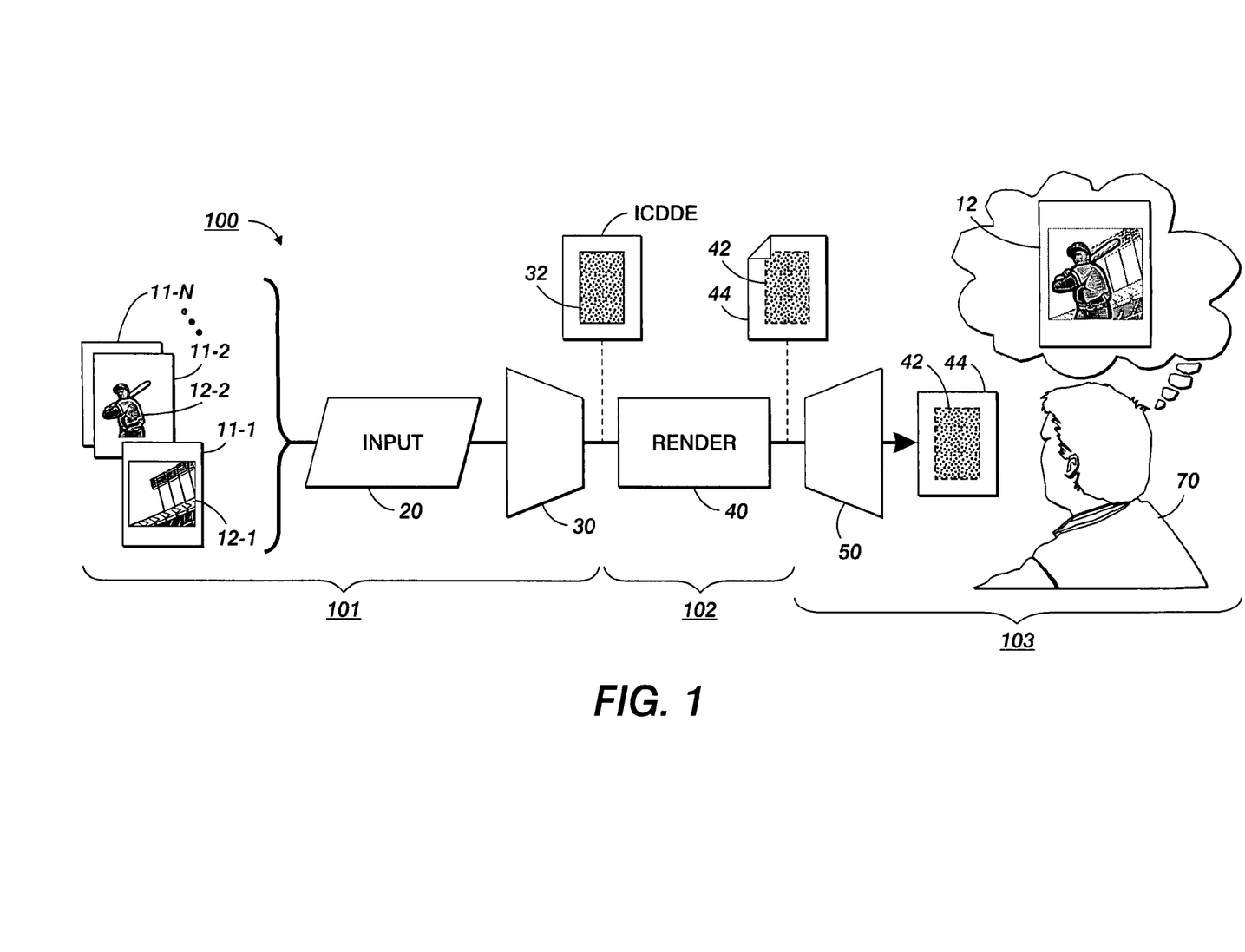
FIG. 1 is a block diagram of a system for illuminant/colorant depth discrimination encoding (ICDDE) and illuminant/colorant depth discrimination decoding (ICDDD) of plural source images, and for rendering a composite image having therein at least one encoded source image, constructed according to the invention.

FIG. 1 illustrates a system 100 operable in a first mode for encoding a plurality of source images to form a composite image, in a second mode for rendering the composite image, or in a third mode for decoding the rendered composite image so as to provide depth discrimination of at least one of the plurality of source images when viewed by an observer.

As shown in FIG. 1, a plurality of disparate source image arrays 11-1, 11-2, . . . 11-N are presented to an illuminant/colorant depth discrimination encoding subsystem 101. Image input device 20 may be equipped to receive plural monochromatic images or a combination of monochromatic and polychromatic images. Image input device 20 may include an image capture device such as a digital scanner coupled to a random access memory, or any type of analog or digital camera coupled to a storage means such as a computer memory or a magnetic or optical recording medium. Image input device 20 may also include devices for receiving an image that had previously been stored in a random access memory, on video tape, or a laser-encoded disk, etc., or for receiving an image created by a computer image generator, or an image encoded in an appropriate format and transmitted on a network.

The illustrative representation of the plural source images in respective image arrays received by the image input device 20 in this example includes a first source image 12-1 represented in a first source image array 11-1 and a second source image 12-2 represented in a second source image array 11-2. The subsystem 101 can optionally receive N source images which are represented in respective image arrays. In this illustrated embodiment, disparate pictorial source images are employed and at least one of the plural source images (second source image 12-2) is intended for recovery with depth discrimination with respect to at least some of the remaining image content when decoded and viewed by an observer 70.

The source image data is received in the input image device 20 and presented to an encoder 30, which encodes a representation of a composite of at least first and second source images, so as to provide a composite image 32 on an illuminant/colorant depth discrimination encoder (ICDDE) image plane. Such encoding may proceed in one embodiment with mapping for every pixel location, or by mapping in localized areas rather than specific pixels, to the composite image 32, so as to encode the information necessary for each corresponding pixel located in each source image.

Next, according to operation of a composite image rendering subsystem 102, data representative of the composite image is provided to a rendering device 40, and such provision can be carried out if necessary by use of any one of a variety of suitable means for transmitting or storing electronic information. The rendering device 40 records the composite image 32 on a substrate 44 by application of a predetermined array of narrowband colorants, so as to form a rendered composite image 42. The rendered composite image 42 is thereby fixed on the substrate 44.

The rendered composite image 42 is then available to an observer 70 for viewing in a variety of lighting conditions, including ambient light. Although the rendered composite image 42 is representative of data encoded in the ICDDE plane, the rendered composite image 42 typically exhibits a flat (i.e., lacking in depth) characteristic under conventional ambient light. Depth discrimination of one or more source images is typically not realized until a decoding subsystem 103 is operated to selectively illuminate the composite image 42 in a manner sufficient to provide the desired depth discrimination.

Upon operation of a decoding system 103, a particular source image (for example, as shown in FIG. 1, the source image 12-1) may be depth discriminated with respect to some or all of the image content in the rendered composite image 42. In the embodiment illustrated in FIG. 1, the illuminant output of the decoder 50 is directed to the substrate 44 which is located in the presence of an observer 70. The decoded image is then perceived by the observer 70, whereby the particular source image 12-1 is perceived to be depth discriminated with respect to the some or all of the image content in the rendered composite image 42 present on the substrate 44. The substrate 44 is typically positioned proximate to an illuminant source operable within the decoder 50, such that the array of colorants in the rendered composite image 42 are subjected to the predefined spectral power distributions of the selected illuminants. As a result of the rendered composite image 42 thus being controllably and selectively illuminated by selected illuminants, a desired source image is then depth discriminated by an observer 70 by virtue of the aforementioned interaction of one or more colorants and their complementary illuminants, and due to the visual response of the observer 70 to this particular interaction. The recovery of specific encoded source images and the extent of their depth discrimination during this decoding is controllable according to the array of colorants chosen to compose the rendered composite image 42, and certain characteristics (such as the intensity, duration, and spectral power distribution) of the selected illuminants provided by the decoder 50.

Figure 2:
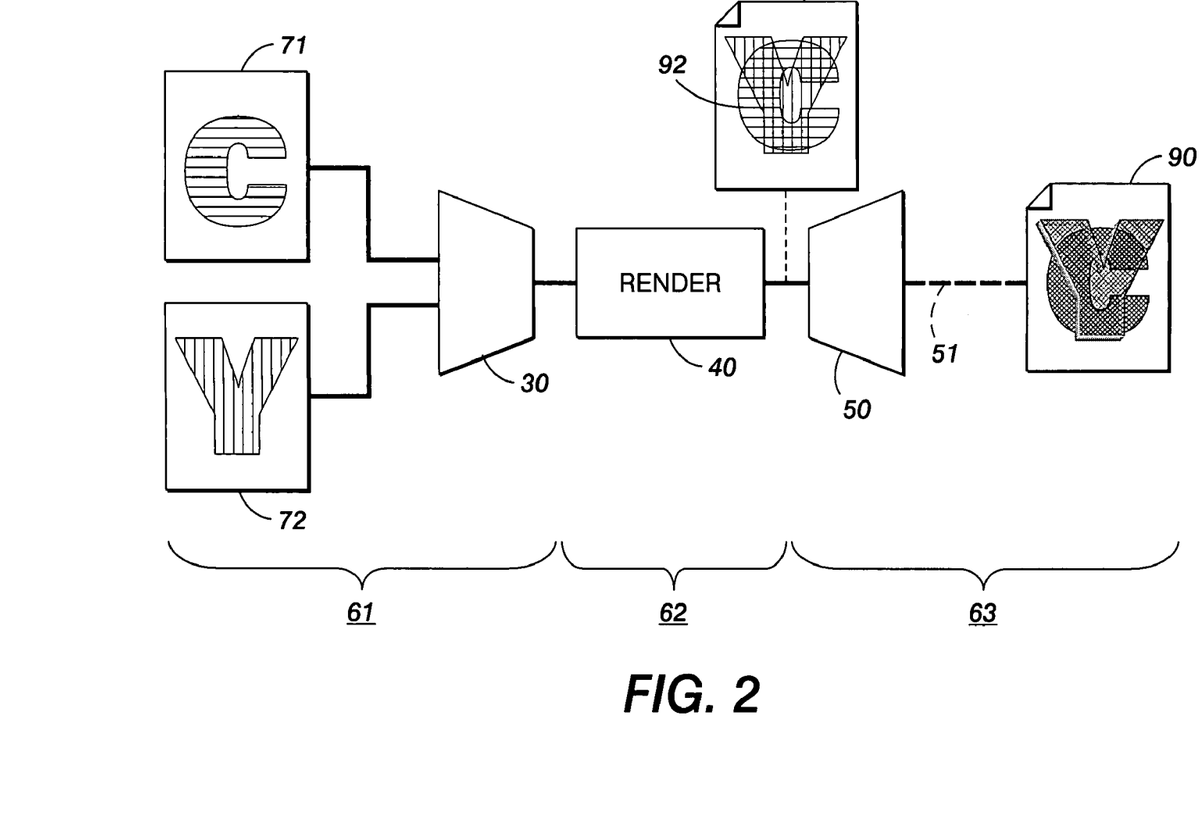
FIG. 2 is a simplified schematic diagram of an embodiment of the system of FIG. 1 for encoding first and second source images in a composite image, rendering the composite image with use of at least two colorants, and for decoding the rendered composite image.

FIG. 2 is a simplified schematic diagram of exemplary embodiments of encoding, rendering, and decoding methods 61, 62, 63, respectively. In method 61 for encoding plural source images, image data representing a source image in a first separation image 71 and a second separation image 72 are provided to the encoder 30, which outputs a composite image data file to a rendering device 40. The rendering device 40 provides a substrate 90 which has incorporated therein a composite array 92 of colorants. In the illustrated embodiment, separation image 71 is encoded so as to result in pixels formed in the rendered composite image 92 using a first colorant that is complementary to an illuminant in the long wavelength band; for example, a cyan ink or toner. The second separation image 72 is similarly encoded so as to be rendered in the rendered composite image using a second colorant that is complementary to an illuminant in a short wavelength band; for example, a yellow ink or toner. The composite image thus encoded specifies patterns of cyan and yellow colorants that are accordingly deposited on the substrate 90 to form the rendered composite image 92. Those skilled in the art will appreciate that certain portions of the two patterns may be co-located and other portions are spatially distinct. Nonetheless, in some embodiments, visual recognition in ambient wideband light of at least one of the plural source images encoded in the composite image can be made difficult or impossible, due to the confusion between colorant patterns in the rendered composite image.

In the method 63 for decoding the rendered composite image 92, the rendered composite image 92 is illuminated by the decoder 50. Controlled illumination 51 of the rendered composite image 92 causes the first separation image 71 to be perceived at a particular depth with respect to some or all of the remaining content of the rendered composite image 92 and the second separation image 72 to be discriminated at another depth with respect to some or all of the remaining content of the rendered composite image 92. In the illustrated embodiment, the first source image 71 and the second source image 72 are therefore selectably depth discriminated. Controlled illumination may be effected according to simultaneous operation of first and second illuminants to thereby cause at least one of the first separation image 71 and the second separation image 72 to be depth discriminated. As previously described, near-concurrent (e.g., switched) operation of the controlled illumination thereby also causes at least one of the first separation image 71 and the second separation image 72 to be depth discriminated.

Figure 3:
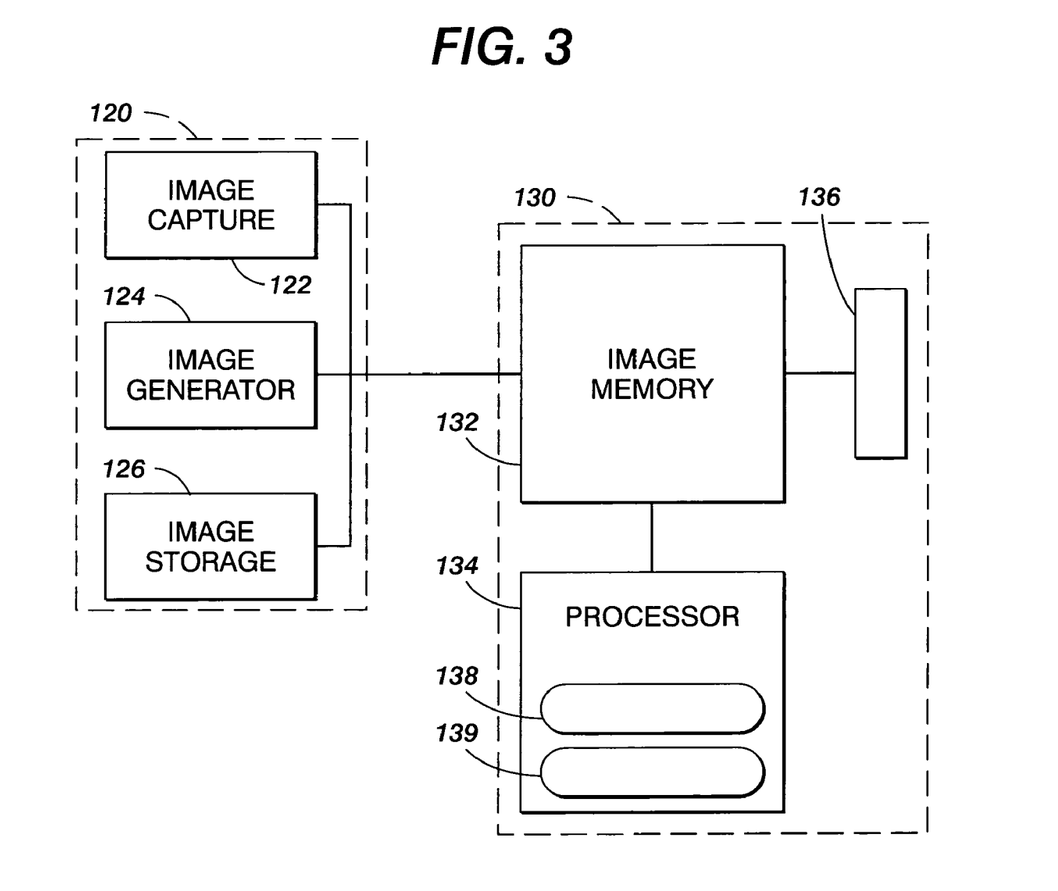
FIG. 3 is a schematic simplified representation of an embodiment of the encoding subsystem of FIG. 1, in which an image processing unit and associated peripheral devices and subsystems are employed.

FIG. 3 illustrates a schematic simplified representation of the encoding subsystem 101 of FIG. 1, in which an image processing unit 130 and associated peripheral devices and subsystems are employed. An image input terminal 120 may include an image capture device 122 such as a scanner, digital camera, or image sensor array; a computer image generator 124 or similar device, either networked or stand-alone, that converts data to an image; or an image storage device 126 such as a semiconductor memory or a magnetic, optical, or magneto-optical data storage device. The image input terminal 120 derives or delivers digital image data in the form of, for example, plural monochromatic image files, wherein the picture elements or "pixels" of each image are defined at some gray value. For example, the input terminal 120 may be employed to derive an electronic representation of, for example, a document or photograph by use of image capture device 122, in a format related to the physical characteristics of the device, and commonly with pixels defined at m bits per pixel. If a color document, the image may be defined with two or more separation bitmaps, usually with specific resolution and pixel depth. Image data from the input terminal 120 is directed to an image processing unit (IPU) 130 for processing so as to be encoded to create a composite image. It will be recognized that the data representing one or more source images is encoded by the image processing unit 130 to provide secondary image data representative of a composite image suitable for subsequent rendering.

The image processing unit 130 may include an image memory 132 which receives input image data from image input terminal 120 or from another suitable image data source, such as an appropriately programmed general purpose computer or other network data source (not shown) and stores the input image data in suitable memory devices such as random access memory (RAM). The input image data may be processed via a processor 134 to provide image data representative of plural source images defined on respective source image planes. For example, image data signals in the form of red, green, and blue (RGB) or black and white (B/W) images may be processed, and the luminance information derived therefrom may be used to provide data representative of source images for incorporation into a composite image. Image data signals presented in other formats are similarly processed: image data signals in, for example the L*a*b format, may be processed to obtain data representing a source image from the lightness channel. Image data signals that are already formatted in grayscale are generally usable without further processing.

Operation of the image processing unit 130 may proceed according to one or more image processing functions 138, 139 so as to encode the source image data into the composite image file as described hereinabove. Processing may include a color conversion which, if necessary, may be implemented to convert a three-component color description to a (printer-specific) four or more component color description, and may include a halftoner which converts a c bit digital image signals to d bit digital image signals, suitable for driving a particular printer, where c and d are integer values. In certain embodiments, additional functions may include one or more of color space transformation, color correction, gamut mapping, and under color removal (UCR)/gray component replacement (GCR) functions. Control signals and composite image output data are provided to an interface 136 for output from the image processing unit 130.

The image processing unit 130 may be embodied as an embedded processor, or as part of a general purpose computer. It may include special purpose hardware such as for accomplishing digital signal processing, or merely represent appropriate programs running on a general purpose computer. It may also represent one or more special purpose programs running on a remote computer.

Figure 4:
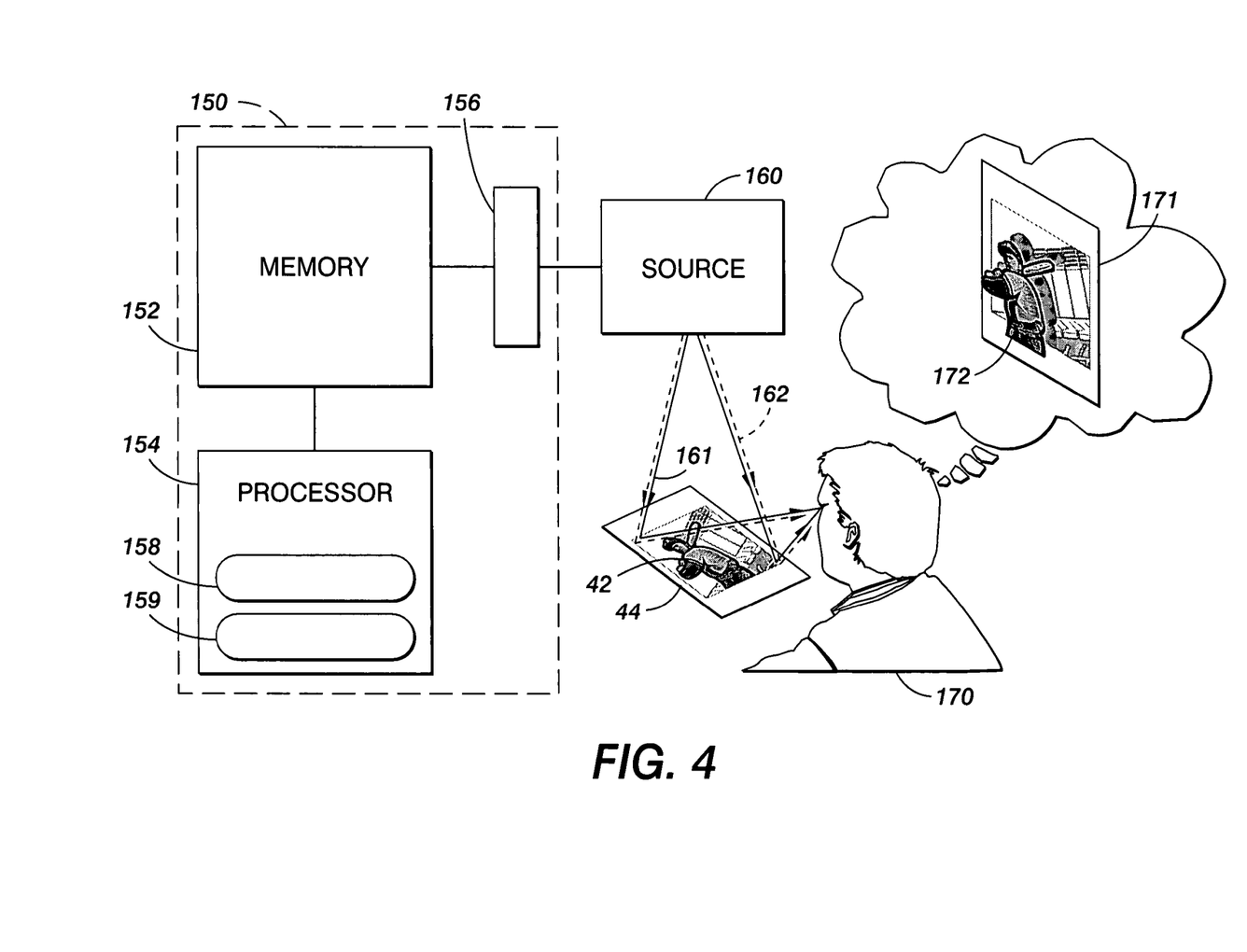
FIG. 4 is a simplified schematic representation of an embodiment of the decoding subsystem of FIG. 1, in which a controller and associated peripheral devices and subsystems are employed.

FIG. 4 is a simplified schematic representation of the decoder subsystem 103 of FIG. 1, in which a controller and associated peripheral devices and subsystems are employed to obtain one or more depth-discriminated source images. FIG. 4 shows a controller 150 connected to an illuminant source 160 that is operable for subjecting the rendered composite image 42 on substrate 44 to at least first and second predefined illuminants 161, 162. Upon activation of the source 160 so as to provide controlled illumination using a first predefined illuminant 161 and a second predefined illuminant 162, whereupon certain image content 172 is depth discriminated with respect to the remaining image content 171 in the rendered source image 42.

The controller 150 may be constructed as in the form of a manually-operable illuminant selector switch. Alternatively, as illustrated, the controller 150 may be provided in the form of a computer-based control device having an interface 156 connected to source 160, which offers programmable control of the operation of the illuminant source 160. The controller 150 may thus be operated to cause selective activation and deactivation of the illuminant source 160 so as to provide a selected field of illumination having illuminants 161, 162. Such control may, for example, the accomplished via manual operation of the illuminant source 160 by a human operator, or by programmable control afforded by a computer or similar means.

The controller 150 and source 160 are interoperable for accomplishing various tasks such as activation, deactivation, or sequencing of the illuminant field, illuminant intensity, illuminant frequency, etc. Embodiments of the controller 150 benefit from operation of a programmable control system comprising standard memory 152 and processor 154. The controller 150 may be employed, for example, to supply uniform R or G or B screen images to the interface 156 for subsequent output by the illuminant source 160 when the latter is constructed to include a computer monitor display device. Operation of the illuminant source 160 by the controller 150 may proceed according to certain sequenced control functions so as to provide, for example, controlled operation of the illuminant source 160 to afford a field of illumination that varies according to selected characteristics, such as: sequential or simultaneous activation and deactivation of selected illuminants, each having a predefined spectral power distribution; controlled variation of the intensity of selected illuminants; or for interactive control according to intervention by an operator of the particular sequence, intensity, or duration of the illuminants. As noted above, the rendered composite image may be constructed to have a plurality of source images encoded therein; for example, of at least first and second patterns of respective first and second colorants. The rendered composite image 42 may be subjected to a temporal or spatial sequencing of illumination by respective first and second narrowband illuminants.

FIGS. 5, 6, 7, and 8 are examples of actual rendered composite images, wherein first and second source images were encoded in a composite image and the composite image was rendered in cyan and yellow colorants; such first and second source images have been observed to be capable of depth discrimination when the rendered composite image is simultaneously illuminated by red and blue narrowband illuminants. FIGS. 5-8 are rendered composite images produced by use of a XEROX Phaser 8200DX color laser printer employing solid CMYK inks, operating with image color management disabled, and equipped with white paper stock as the suitable substrate material.

Figure 5:
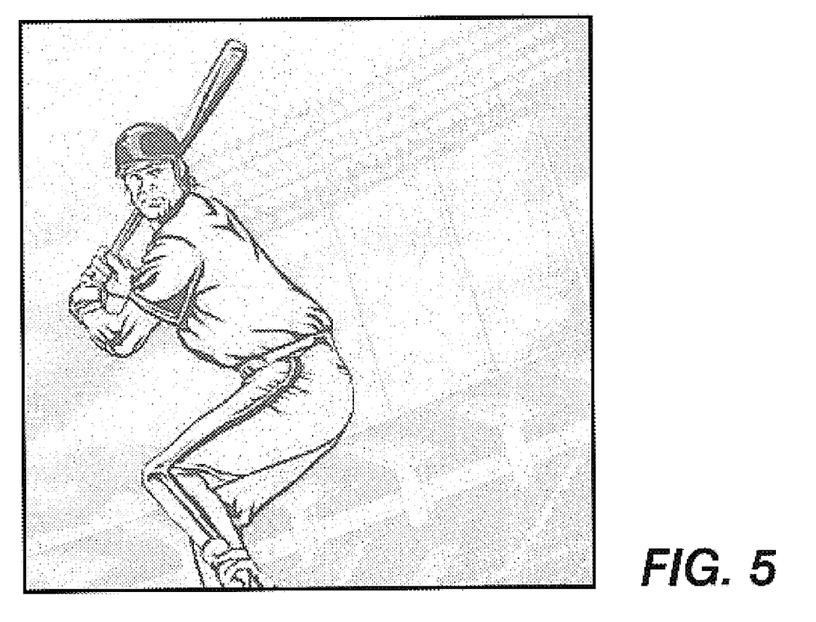
FIGS. 5 through 8 are actual examples of rendered composite images, wherein first and second source images were encoded in a composite image and the encoded composite image was rendered in cyan and yellow colorants. The first and second source images have been observed to be susceptible of depth discrimination when the rendered composite image is simultaneously illuminated by red and blue narrowband illuminants.

FIG. 5 illustrates use of a cut-out construction technique in encoding the composite image. In this type of encoding, colorant values representing certain background image content (for example, in a second source image) are significantly reduced at locations that are co-located with the foreground image content (located, for example, in the first source image.) The rendered composite image in FIG. 5 shows a first source image (of a baseball player) rendered in cyan colorant and a second source image (of a stadium) rendered in yellow colorant. In this exemplary embodiment, certain locations of yellow pixel values in the stadium image (that is, yellow values co-located with the cyan pixel values that represent the baseball player) have been set to zero. (Note that, in other embodiments of the cut-out technique, values may be set to a significantly reduced value other than zero. The extent of value reduction is chosen according to considerations of the design of the composite image, such as extent of interference that is deemed desirable or anticipated between the overlapping content of the first and second source images.)

Figure 6:
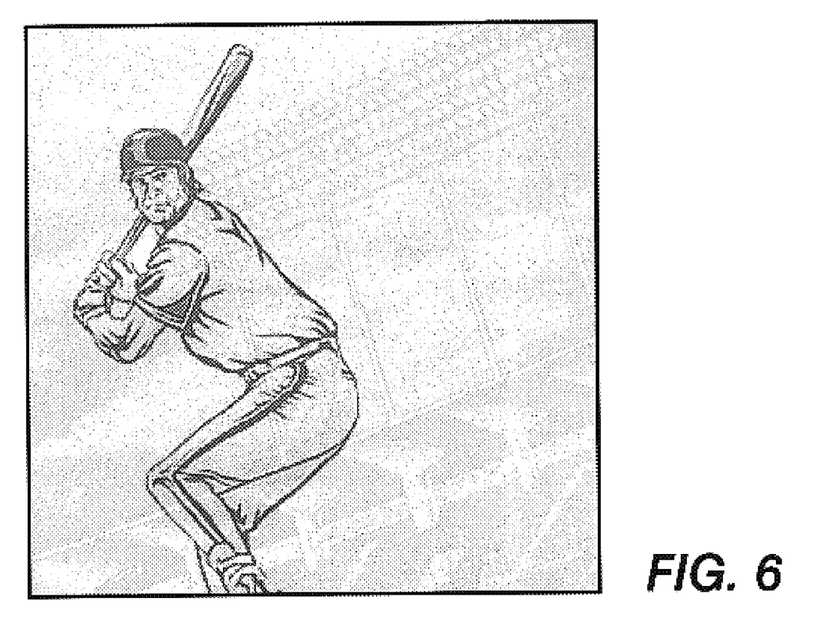

FIG. 6 is another rendered composite image, wherein a simple overlay construction technique was employed for encoding of the composite image, and wherein the cut-out adjustment was not performed. In this exemplary embodiment, the first source image (of a baseball player) was rendered in cyan and a second source image (of a stadium) was rendered in yellow.

Figure 7:
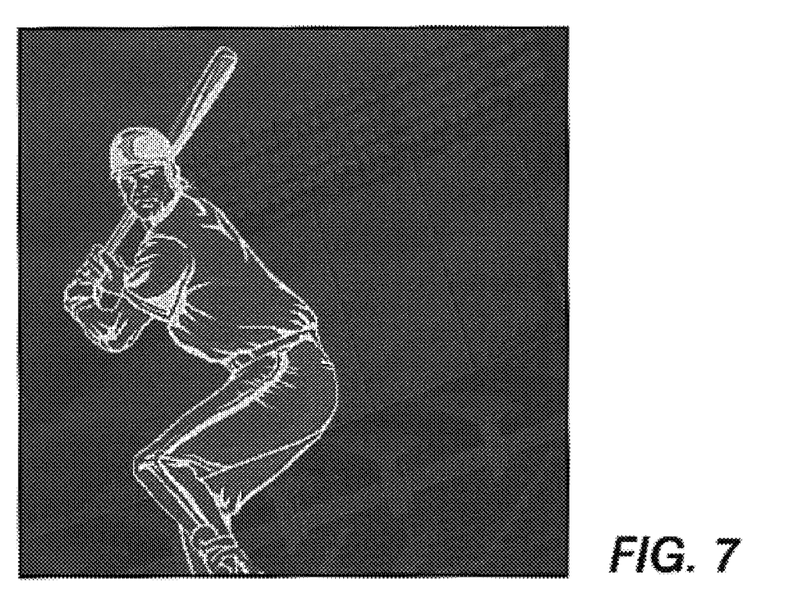

FIG. 7 is another rendered composite image, with the pixel values of the first source image (of a baseball player) being inverted during encoding, and then rendered in cyan. In this exemplary embodiment, the baseball player was rendered in inverted cyan and a stadium image was rendered in yellow. In accordance with the cut-out technique, certain locations of the yellow values in the stadium image have been set to zero where co-located with respect to the pixel values representing the baseball player.

Figure 8:
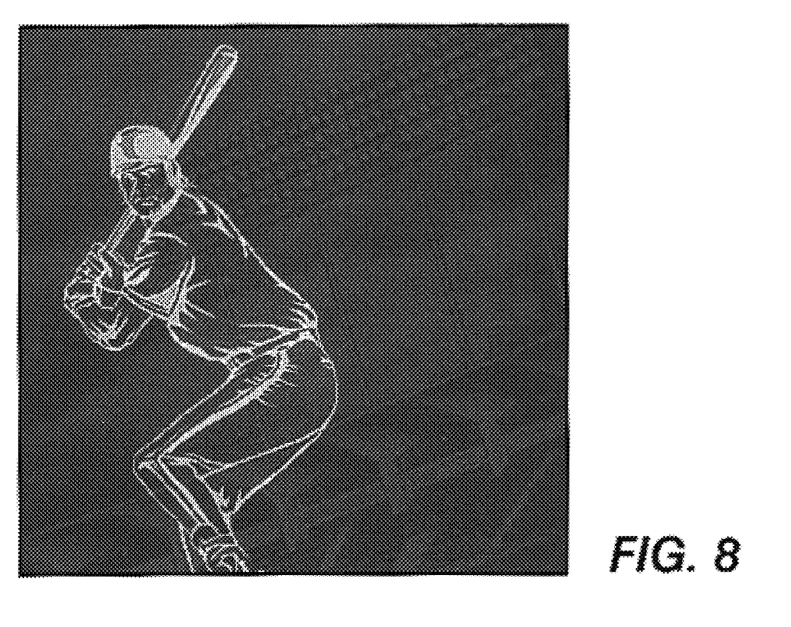

FIG. 8 is another rendered composite image, wherein a simple overlay construction technique was employed for encoding of the composite image, and wherein the cut-out adjustment was not performed. In this exemplary embodiment, the first source image (of a baseball player) was rendered in inverted cyan and a second source image (of a stadium) was rendered in yellow.

According to the teachings herein, a variety of alternatives are within the scope of this invention for implementing the above-described embodiments.

Its advantageous use is expected in color printing by various processes including offset lithography, letterpress, gravure, xerography, photography, and any other color reproduction process which uses a defined number of colorants, usually three or four, in various mixtures. Embodiments of the rendering devices include apparatus other than printers and which may be capable of generating, depositing, or integrating a defined array of colorants on or within a substrate, according to the composite image data, such that the rendered array of colorants is susceptible to selective reflection or transmission of selected narrowband illuminants incident thereon. For example, the composite image may be rendered on a transparent film and the substrate may be backlit by a suitable narrowband illuminant. Examples of rendering devices include hardcopy reprographic devices such as inkjet, dye sublimation, and xerographic printers, lithographic printing systems, silk-screening systems, and photographic printing apparatus; systems for imagewise deposition of discrete quantities of a color on a substrate surface, such as paint, chemical, and film deposition systems; and systems for integration of colorant materials in a substrate, such as plastic molding, textile manufacturing, and textile printing systems.

Embodiments of exemplary substrates include, but are not limited to, materials such as wood; paper, cardboard, and other pulp-based and printed packaging products; glass, plastic, metal, laminated or fibrous compositions, and textiles. Narrowband colorants other than basic CMYK colorants may also be used.

Various narrowband light sources may include apparatus for providing filtered sunlight, filtered incandescent, or filtered fluorescent light; coherent light sources such as a solid-state laser or laser diode; projection or image display devices such as those incorporating a cathode ray tube, flat-panel display, digital light valve, liquid crystal display, plasma display, or a light emitting diode or organic light emitting array.

Additional familiar components (not shown) may be included such as a user interface including a keyboard, and pointing devices, means for reading data storage media, a speaker for providing aural cues and other information to the observer, and adapters for connection of the systems described herein to a network medium. Computer readable media such as memory, hard disks, CD-ROMs, flash memory, and the like may be used to store a computer program including computer code that implements the control sequences.

Embodiments of the invention are contemplated for providing visual stimulation and amusement, particularly by the inclusion of composite images in printed materials such as books or posters, in novelty items, and in software sold to consumers for generating such items. Rendered composite images made using this invention can be distributed to consumers for subsequent depth discrimination when exposed to a field of illumination generated by, for example, a broadcast display device such as a television, or other visual display system, and according to display control signals directed to such devices from a remote source, such as from a networked or broadcast transmission system, or according to display control instructions contained in electronic mail, Internet web pages, or similar transmissions or data packages.

Embodiments of the invention may be employed for implementing specialized visual effects in a public setting, such as at a performance or entertainment venue, or other gathering place where there is control of the ambient lighting; or for drawing the attention of an observer to a particular source of information, such as for disseminating news, entertainment, or advertising, or to messages or indicia, such as trademarks or product instructions; to graphics, art work, and the like used at cinemas, galleries, or museums, or at sports, mass transit, and commercial venues; or to large-format displays such as signs, posters, billboards, or murals. Still other embodiments are contemplated for use in publications, merchandising, or advertising vehicles such as newspapers, periodicals, or maps; containers, wrappers, labels, or other packaging or shipping materials; in building materials including wall or floor coverings, lighting systems, and the like.

Still other embodiments of the invention are contemplated for use in textiles, garments, and other personal items such as fashion accessories, and the like. Items bearing composite images may have educational, artistic, novelty, or collectible value, such as in a souvenir, book, poster, trading card, or toy.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for providing a rendered composite image having image content encoded therein, and for enabling depth discrimination of the image content, comprising:
    encoding a first source image in a composite image to be perceived upon illumination by a first narrowband illuminant having long wavelengths of light within the visible spectrum;
    encoding a second source image in the composite image to be perceived upon illumination by a second narrowband illuminant having short wavelengths of light within the visible spectrum; and
    rendering the composite image to provide a rendered composite image on a substrate having the first source image recorded in the form of an imagewise pattern of a first narrowband colorant, and having the second source image recorded in the form of an imagewise pattern of a second narrowband colorant, wherein the first narrowband illuminant has a respective spectral power distribution that is substantially the complement of the spectral characteristic of the first narrowband colorant and the second narrowband illuminant has a respective spectral power distribution that is substantially the complement of the spectral characteristic of the second narrowband colorant;
    whereby the rendered composite image is susceptible to depth discrimination upon selectively subjecting the rendered composite image to simultaneous illumination incorporating the first and second narrowband illuminants, such that at least one of the first and second source images is depth discriminated with respect to the image content of the rendered composite image.

2. The method of claim 1, wherein the rendered composite image is rendered using first and second narrowband colorants selected from the group consisting of: pigments, inks, dyes, toners, and combinations thereof.

3. The method of claim 1, wherein each of the first and second narrowband illuminants has a selected spectral power distribution which corresponds to the spectral absorption characteristic of a respective one of the first and second narrowband colorants.

4. The method of claim 1, wherein each of the first and second narrowband illuminants has a selected spectral power distribution which corresponds to the spectral reflectance characteristic of a respective one of the first and second narrowband colorants.

5. The method of claim 1, wherein each of the first and second narrowband illuminants has a respective spectral distributions selected from the group consisting of the red, green, and blue regions of the visible spectrum, and wherein each of the first and second narrowband colorants is selected from the group consisting of cyan, magenta, yellow, and black colorants.

6. The method of claim 1, wherein the rendered composite image is susceptible to depth discrimination upon application of the first and second narrowband illuminants at a switch rate.

7. The method of claim 1, wherein the rendered composite image is susceptible to depth discrimination upon application of the first and second narrowband illuminants in a manner within the capacity of an observer to maintain memory of perceived depth discrimination.

8. The method of claim 1, wherein the composite image is provided as a composite image file.

9. The method of claim 1, wherein the first and second source image encoding steps further comprise the step of mapping values representative of each source image pixel to a corresponding pixel value in a respective colorant image plane.

10. The method of claim 9, wherein the mapped values are determined according to at least one of the following sets of spectral characteristics: (a) the spectral characteristics of the colorants selected for rendering the composite image, and (b) the spectral characteristics of the narrowband illuminants used for recovering the source image.

11. The method of claim 1, wherein the source image encoding steps further comprises the steps of:
   converting the first and second source images to monochromatic separation images; and
   mapping the monochromatic separation images to a corresponding colorant image plane in the composite image.

12. The method of claim 1, wherein the first and second narrowband colorants are assigned to respective colorant image planes of the composite image, and the mapped values in the respective colorant image planes represent the relative amounts of the narrowband colorants to be deposited in the rendered composite image.

13. The method of claim 1, wherein the composite image is rendered in an imagewise pattern of first and second narrowband colorants, said first and second narrowband colorants exhibiting a predefined spectral reflectance characteristic respectively in the short and long wavelength bands.

14. The method of claim 1, wherein the composite image is rendered in an imagewise pattern of first and second narrowband colorants, said first and second narrowband colorants exhibiting a predefined spectral absorption characteristic respectively in the short and long wavelength bands.

15. The method of claim 1, wherein the image content includes a foreground image content and a background image content, and wherein a first plurality of colorant values in the encoded composite image that represent the background image content are substantially reduced at locations that are co-located with a second plurality of colorant values in the encoded composite image that represent the foreground image content.

16. The method of claim 1, wherein the rendered composite image is rendered by use of a color electrophotographic printer.

17. A system for providing a rendered composite image having image content encoded therein, and for enabling depth discrimination of the image content, comprising:

an encoding subsystem for encoding a first source image in a composite image to be perceived upon illumination by a first complementary narrowband illuminant having a respective first spectral power distribution, and for encoding a second source image in the composite image to be perceived upon illumination by a second narrowband illuminant having a respective second, spectral power distribution; and a rendering subsystem for rendering the composite image to provide a rendered composite image on a substrate having the first source image recorded in the form of an imagewise pattern of a first narrowband colorant, and having the second source image recorded in the form of an imagewise pattern of a second narrowband colorant;

wherein the first spectral power distribution is substantially the complement of the spectral characteristic of the first narrowband colorant and the second spectral power distribution is substantially the complement of the spectral characteristic of the second narrowband colorant;

whereby the rendered composite image is susceptible to depth discrimination upon selectively subjecting the rendered composite image to simultaneous illumination incorporating the first and second narrowband illuminants, such that at least one of the first and second source images is depth discriminated with respect to the image content of the rendered composite image.

18. The system of claim 17, further comprising a decoding subsystem for subjecting the rendered composite image to a predefined field of illumination that includes the first and second complementary narrowband illuminants, whereby at least one of the first and second source images may be recovered with depth discrimination.

19. The system of claim 18, wherein the decoding subsystem further comprises an illumination device for subjecting the rendered composite image to an incident light spectrum having a selected spectral power distribution in two selectable bands of radiant energy chosen from the long, medium, and short wavelength bands of the visible light spectrum.

20. The system of claim 18, wherein the decoding subsystem further comprises an illumination device for providing a field of illumination that simultaneously includes the first and second complementary narrowband illuminants, and wherein the first and second narrowband illuminants each exhibit a respective complementary spectral power distribution which corresponds to at least one of the spectral reflectance characteristic or the spectral absorption characteristic of the respective first and second narrowband colorants.

* * * * *